United States Patent
Kanemitsu et al.

(10) Patent No.: US 9,148,595 B2
(45) Date of Patent: Sep. 29, 2015

(54) SOLID STATE IMAGING DEVICE, DISTANCE MEASURING DEVICE, AND DISTANCE MEASURING METHOD

(75) Inventors: Shiroshi Kanemitsu, Kanagawa (JP); Tatsuji Ashitani, Kanagawa (JP); Miho Iizuka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 339 days.

(21) Appl. No.: 13/617,113

(22) Filed: Sep. 14, 2012

(65) Prior Publication Data

US 2013/0242087 A1    Sep. 19, 2013

(30) Foreign Application Priority Data

Jan. 31, 2012  (JP) ................. 2012-018123

(51) Int. Cl.
| | | |
|---|---|---|
| *H04N 5/335* | (2011.01) | |
| *H04N 5/353* | (2011.01) | |
| *H04N 5/369* | (2011.01) | |
| *H04N 5/355* | (2011.01) | |
| *G01C 3/18* | (2006.01) | |
| *G03B 13/36* | (2006.01) | |

(52) U.S. Cl.
CPC .............. *H04N 5/369* (2013.01); *G01C 3/18* (2013.01); *G03B 13/36* (2013.01); *H04N 5/3535* (2013.01); *H04N 5/35554* (2013.01)

(58) Field of Classification Search
CPC ...... G01B 11/02; G01B 11/08; G01B 11/046; G01B 11/043
USPC .................................. 348/61, 135
See application file for complete search history.

(56) References Cited

U.S. PATENT DOCUMENTS

| | | | | |
|---|---|---|---|---|
| 5,946,424 A | * | 8/1999 | Oshima | 382/293 |
| 7,362,419 B2 | * | 4/2008 | Kurihara et al. | 356/4.07 |
| 8,102,463 B2 | | 1/2012 | Komaba et al. | |
| 2002/0071046 A1 | * | 6/2002 | Harada | 348/316 |
| 2008/0074534 A1 | * | 3/2008 | Kusaka | 348/364 |
| 2011/0169948 A1 | | 7/2011 | Ohtomo et al. | |

FOREIGN PATENT DOCUMENTS

| | | |
|---|---|---|
| JP | 2004-233116 | 8/2004 |
| JP | 2006-84429 | 3/2006 |
| JP | 2006-253876 | 9/2006 |
| JP | 2009-89143 | 4/2009 |
| JP | 2010-54968 | 3/2010 |
| JP | 2011-145109 | 7/2011 |
| JP | 2011-164586 | 8/2011 |

OTHER PUBLICATIONS

Shree K. Nayar & Tomoo Mitsunaga,"High Dynamic Range Imaging: Spatially Varying Pixel Exposures", 2000, IEEE,1063-6919/00.*

(Continued)

*Primary Examiner* — Sath V Perungavoor
*Assistant Examiner* — Clifford Hilaire
(74) *Attorney, Agent, or Firm* — Oblon, McClelland, Maier & Neustadt, L.L.P.

(57) ABSTRACT

According to one embodiment, a solid state imaging device includes a first image sensor, a second image sensor, and an imaging processing circuit. A plurality of photoelectric conversion units are arranged in each of the first image sensor and the second image sensor. All of the photoelectric conversion units are configured to include pixels with different charge storage times. The imaging processing circuit includes an output combining unit. The output combining unit combines outputs by the pixels with different charge storage times with respect to each of the photoelectric conversion units.

14 Claims, 9 Drawing Sheets

(56) References Cited

OTHER PUBLICATIONS

Nayar, Shree K., and Tomoo Mitsunaga. "High dynamic range imaging: Spatially varying pixel exposures." Computer Vision and Pattern Recognition, 2000. Proceedings. IEEE Conference on. vol. 1. IEEE, 2000.*

Japanese Office Action issued Oct. 28, 2014, in Japan Patent Application No. 2012-018123 (with English translation).

* cited by examiner

SOLID STATE IMAGING DEVICE, DISTANCE MEASURING DEVICE, AND DISTANCE MEASURING METHOD

CROSS-REFERENCE TO RELATED APPLICATIONS

This application is based upon and claims the benefit of priority from Japanese Patent Application No. 2012-018123, filed on Jan. 31, 2012; the entire contents of all of which are incorporated herein by reference.

FIELD

Embodiments disclosed herein relate generally to a solid state imaging device, a distance measuring device, and a distance measuring method.

BACKGROUND

A distance measuring device based on a phase difference detection method is known as an example of a distance measuring device that measures a distance to an object to be measured. In a phase difference detection method, a phase difference between object images captured by photographing the same object at different positions is detected, and a distance to the object is calculated based on the phase difference. A solid state imaging device including a charge storage type photoelectric conversion element is used to capture an object image. In a distance measuring device using a charge storage type photoelectric conversion element, if a charge storage time is not adequately controlled, there is a case where an output by photoelectric conversion can hardly be obtained, or a case where an output is saturated with respect to an incident light amount. In this case, it is difficult to detect an accurate distance to an object.

In order to avoid such a trouble, for example, measures may be taken to set an optimum storage time to a plurality of segmented regions and read image data a plurality of times. For example, as in a focusing device of a camera or the like, when the speed up of adjustment is required, a distance measuring device needs high-speed distance measurement. A solid state imaging device including a charge storage type photoelectric conversion element may promote the speed up of read processing by allowing output read to be limited to a portion of segmented regions. On the other hand, since the solid state imaging device needs to store a charge a plurality of times, high-speed phase difference detection is difficult.

DETAILED DESCRIPTION

In general, according to one embodiment, a solid state imaging device includes a first image sensor, a second image sensor, and an imaging processing circuit. The first image sensor captures a first object image. The second image sensor is provided in parallel with the first image sensor. The second image sensor captures a second object image. The second object image has a phase difference with respect to the first object image. The imaging processing circuit performs signal processing on an image signal. The image signal is obtained by capturing the first object image in the first image sensor and capturing the second object image in the second image sensor. A plurality of photoelectric conversion units are arranged in each of the first image sensor and the second image sensor. All of the photoelectric conversion units of the first image sensor and the photoelectric conversion units of the second image sensor are configured to include pixels with different charge storage times. The imaging processing circuit includes an output combining unit. The output combining unit combines outputs by the pixels with different charge storage times with respect to each of the photoelectric conversion units.

Hereinafter, a solid state imaging device, a distance measuring device, and a distance measuring method according to embodiments will be described in detail with reference to the accompanying drawings. In addition, the present invention is not limited by these embodiments.

Figure 1:
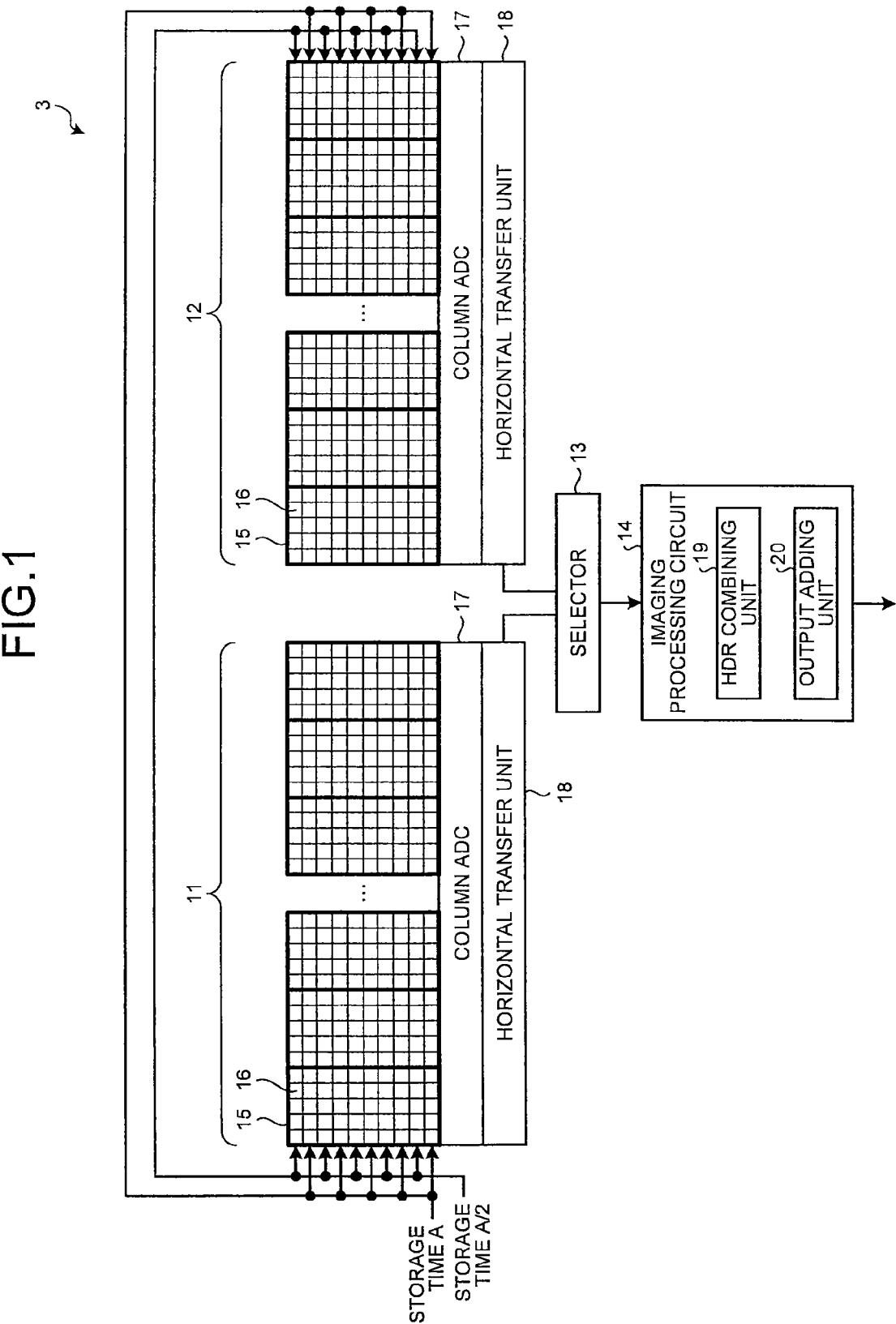
FIG. 1 is a schematic diagram illustrating a schematic configuration of a solid state imaging device according to a first embodiment.
Figure 2:
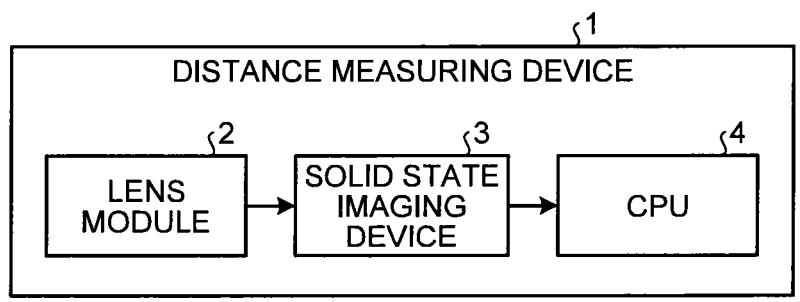
FIG. 2 is a block diagram illustrating a schematic configuration of a distance measuring device including the solid state imaging device illustrated in FIG. 1.

FIG. 1 is a schematic diagram illustrating a schematic configuration of a solid state imaging device according to a first embodiment. FIG. 2 is a block diagram illustrating a schematic configuration of a distance measuring device including the solid state imaging device illustrated in FIG. 1. A distance measuring device 1 is applied, for example, to a focusing device of a camera or the like.

The distance measuring device 1 includes a lens module 2, a solid state imaging device 3, and a CPU 4. The lens module 2 receives light from an object to be measured, and forms an image of the object as an object image. The solid state imaging device 3 converts the light received by the lens module 2 into a signal charge, and captures an object image. The CPU 4 calculates a distance to the object based on a phase difference of the object image captured by the solid state imaging device 3. The CPU 4 functions as an operation unit.

The solid state imaging device 3 includes line sensors 11 and 12, a selector 13, and an imaging processing circuit 14.

The line sensor 11 is a first image sensor capturing a first object image. The line sensor 12 is provided in parallel with the line sensor 11. A second object image has a phase difference with respect to the first object image.

The line sensors 11 and 12 are, for example, complementary metal oxide semiconductor (CMOS) image sensors. Instead of CMOS image sensors, charge coupled devices (CCDs) may be used as the line sensors 11 and 12.

Each of the line sensors 11 and 12 includes a plurality of photoelectric conversion units 15, a column analog-to-digital converter (ADC) 17, and a horizontal transfer unit 18. In the line sensors 11 and 12, a plurality of photoelectric conversion units 15 are arranged in a horizontal direction. Each of the photoelectric conversion units 15 includes a plurality of pixels 16.

The column ADC 17 converts signals, which are transferred from the pixel 16 to a vertical read line (not illustrated), from an analog mode into a digital mode. The horizontal transfer unit 18 sequentially reads signals that are converted into a digital mode by the column ADC 17.

The selector 13 sequentially switches an image signal obtained by capturing the first object image in the line sensor 11 and an image signal obtained by capturing the second object image in the line sensor 12, and outputs the same to the imaging processing circuit 14. The imaging processing circuit 14 performs signal processing on an image signal from the line sensor 11 and an image signal from the line sensor 12, and outputs the results to the CPU 4. The imaging processing circuit 14 includes an HDR combining unit 19 for high dynamic range (HDR) combination and an output adding unit 20.

The HDR combining unit 19 functions as an output combining unit that combines outputs by pixels with different charge storage times with respect to each of the photoelectric conversion units 15. The output adding unit 20 adds outputs from the HDR combining unit 19 about the respective pixels 16 with respect to each of the photoelectric conversion units 15, as an output of each of the photoelectric conversion units 15.

The solid state imaging device 3 is not limited to the configuration that inputs both an image signal from the line sensor 11 and an image signal from the line sensor 12 into the same imaging processing circuit 14. The solid state imaging device 3 may include an imaging processing circuit 14 corresponding to the line sensor 11 and an imaging processing circuit 14 corresponding to the line sensor 12.

The CPU 4 detects a phase difference between the first and second object images from an image signal that is signal-processed by the imaging processing circuit 14. The CPU 4 calculates a distance from the object based on the detected phase difference.

Figure 3:
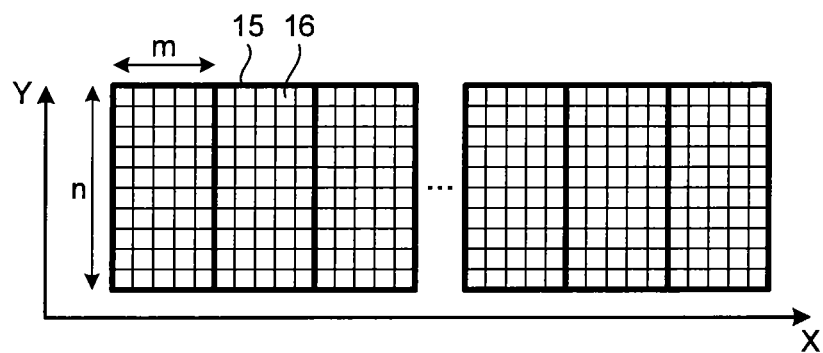
FIG. 3 is a diagram describing a configuration of a photoelectric conversion unit.

FIG. 3 is a diagram describing a configuration of the photoelectric conversion unit. A plurality of photoelectric conversion units 15 provided in the line sensors 11 and 12 are arranged in an X direction that is a horizontal direction. The plurality of photoelectric conversion units 15 each include a plurality of pixels 16 that are arranged in the X direction and a Y direction that is a vertical direction.

In the present embodiment, in each of the photoelectric conversion units 15, pixels 16 are arranged in an array configuration, for example, 5 pixels in the X direction (m=5) and 10 pixels in the Y direction (n=10). It is assumed that the number of photoelectric conversion units 15 arranged in each of the line sensors 11 and 12 is identical. It is assumed that the number of pixels 16 in each of the photoelectric conversion units 15 is identical. In addition, it is assumed that the number "m" of pixels 16 arranged in the X direction in the photoelectric conversion unit 15 may be at least 1 and the number "n" of pixels 16 arranged in the Y direction in the photoelectric conversion unit 15 may be at least 2, and they may be changed appropriately.

With respect to the respective lines constituted by pixels 16 arranged in parallel to the X direction in each of the photoelectric conversion units 15, the solid state imaging device 3 performs control such that the charge storage times alternate, for example, between A and A/2.

Figure 4:
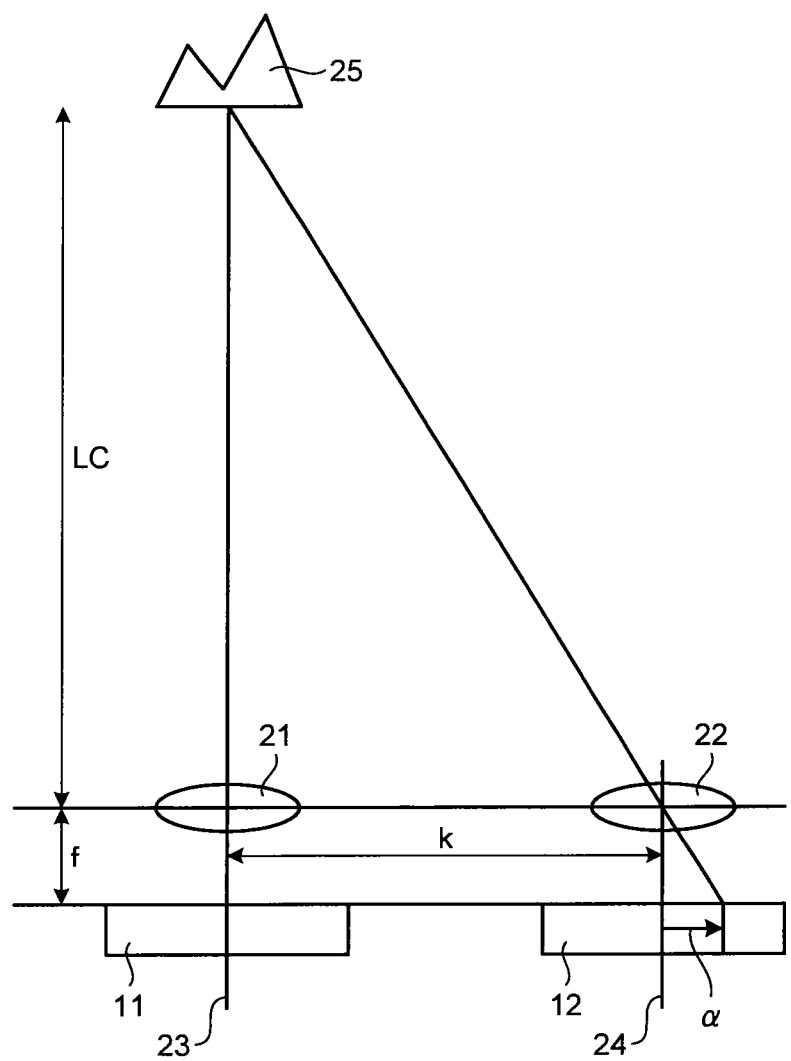
FIG. 4 is a diagram describing detection of a phase difference by a distance measuring device and calculation of a distance.

FIG. 4 is a diagram describing the detection of a phase difference by the distance measuring device and calculation of a distance. The distance measuring device 1 measures a distance from an observation point to an object 25, for example, by a triangulation distance measuring method that will be described below.

The lens module 2 includes a first imaging lens 21 and a second imaging lens 22. The first imaging lens 21 is provided to face the line sensor 11. The second imaging lens 22 is provided to face the line sensor 12. The first imaging lens 21 and the second imaging lens 22 are arranged in a vertical direction with respect to an optical axis 23 of the first imaging lens 21 and an optical axis 24 of the second imaging lens 22.

The first imaging lens 21 receives light from the object 25 to be measured, and enters the light into the line sensor 11. The first imaging lens 21 forms a first object image, which is an image of the object 25, on the line sensor 11.

The second imaging lens 22 receives light from the object 25 to be measured, and enters the light into the line sensor 12. The second imaging lens 22 forms a second object image, which is an image of the object 25, on the line sensor 12.

When it is assumed that the object 25 is at infinity, the first object image is formed on the optical axis 23 in the line sensor 11 and the second object image is formed on the optical axis 24 in the line sensor 12. When it is assumed that the object 25 is at a finite distance or at a medium or short distance, the first object image is formed on the optical axis 23 in the line sensor 11, whereas the second object image is formed at a deviated position by a phase difference α with respect to the optical axis 24 in the line sensor 12.

The CPU 4 performs an operation for converting the phase distance α into an actual distance. A triangle having sides corresponding to a distance LC and a length k between the optical axes 23 and 24 and a triangle having sides corresponding to a focal distance f and the phase difference α are similar in figure to each other. Therefore, the distance LC is obtained by Equation (1) below.

$$LC = f \times k / \alpha \quad (1)$$

Since both the length k and the focal distance f are values fixed by the configuration of the lens module 2, the CPU 4 may calculate the distance LC by obtaining the phase difference α and substituting the obtained phase difference α into Equation (1).

Figure 5:
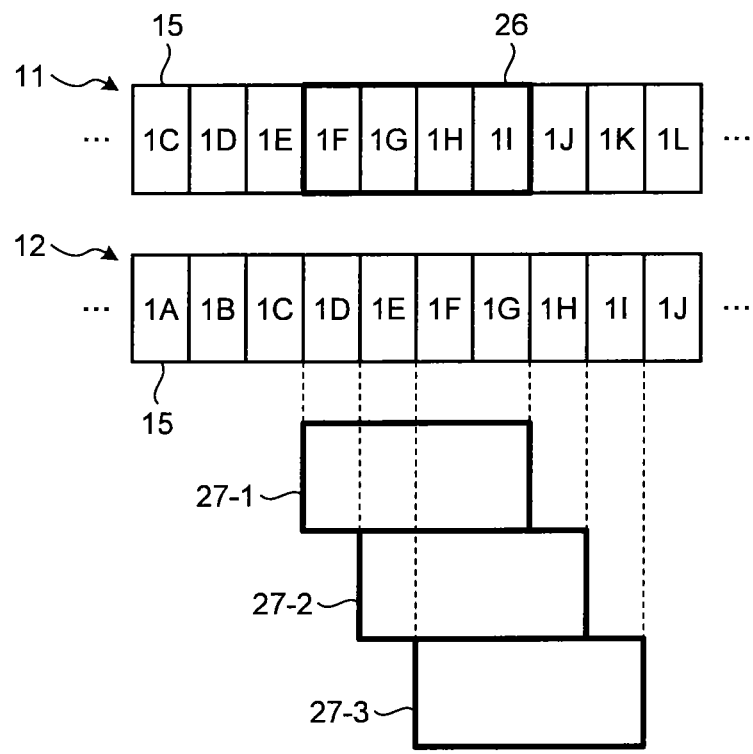
FIG. 5 is a diagram describing detection of a phase difference.

FIG. 5 is a diagram describing the detection of a phase difference. The CPU 4 detects, for example, how many output groups 1F to 1I from the photoelectric conversion units 15 of a reference region 26 in the line sensor 11 are deviated in units of the photoelectric conversion units 15 in an output of the line sensor 12.

The CPU 4 refers to an output group 1D to 1G of the line sensor 12 in a region 27-1 located at the same position as the reference region 26 in the line sensor 11. The CPU 4 compares the output group 1F to 1I from the line sensor 11 and the output group 1D to 1G of the line sensor 12 with respect to each of the photoelectric conversion units 15, and obtains differences of the outputs of the respective photoelectric conversion units 15. The CPU 4 sums up absolute values of the differences obtained with respect to the respective photoelectric conversion units 15. The CPU 4 retains the sum result as an evaluation value for detecting a deviation of the object image.

Next, the CPU 4 refers to an output group 1E to 1H of the line sensor 12 in a region 27-2 that is shifted by one photoelectric conversion unit 15 from the region 27-1. The CPU 4 obtains differences of the outputs of the respective photoelectric conversion units 15 with respect to the output group 1F to 1I from the line sensor 11 and the output group 1E to 1H of the line sensor 12. The CPU 4 sums up absolute values of the differences obtained with respect to the respective photoelectric conversion units 15, as an evaluation value. In this way, the CPU 4 obtains an evaluation value while shifting the region referring to the output group in the line sensor 12.

With respect to the line sensors 11 and 12, when the outputs of the respective photoelectric conversion units 15 are identical, the evaluation value is theoretically zero. When the evaluation value is zero, a deviation amount between the reference region 26 in the line sensor 11 and the region in the line sensor 12 referring to the output corresponds to the phase difference α. However, since an actual evaluation value is slightly greater than zero due to the influence of a noise or the like, the CPU 4 determines the deviation amount corresponding to the minimum evaluation value as the phase difference α. In addition, in the region 27-1 located at the same position as the reference region 26 of the line sensor 11, when the evaluation value is minimized, no phase difference occurs and the object 25 is present at infinity.

In an example illustrated in FIG. 5, in the reference region 26 of the line sensor 11 and a region 27-3 of the line sensor 12 that is shifted by two photoelectric conversion units 15 from the region 27-1, the output group 1F to 1I is identical, and the evaluation value is minimized. In this case, the phase difference α is a length of two photoelectric conversion units 15.

In addition, the CPU 4 is not limited to the case of detecting the phase difference α in units of the length of the photoelectric conversion unit 15. The CPU 4 may be configured to detect a deviation smaller than the length of the photoelectric conversion unit 15, as the phase difference α. For example, the CPU 4 may obtain a deviation amount when the evaluation value is minimized by linear interpolation using the smallest two values among the respective evaluation values, as the phase difference α. The CPU 4 may be configured to calculate the phase difference α by using any one of the conventional correlation operation and interpolation operation.

In the present embodiment, the solid state imaging device 3 obtains the output of the photoelectric conversion unit 15 by using the outputs by m×n pixels 16 constituting the photoelectric conversion unit 15.

Figure 6:
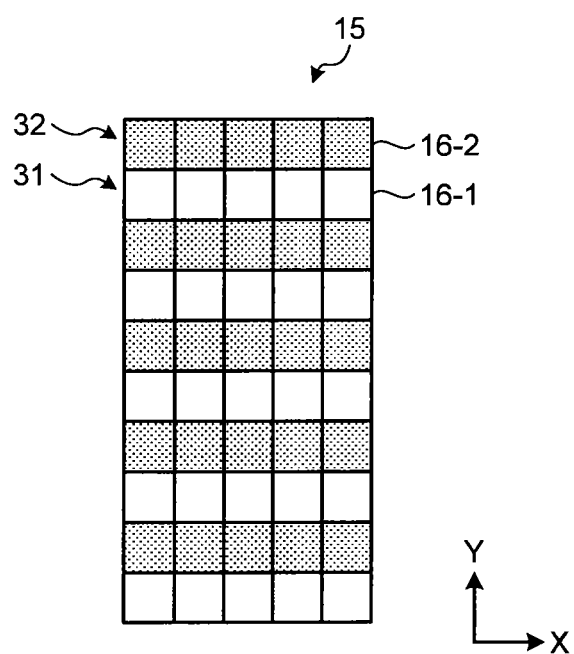
FIG. 6 is a diagram describing an arrangement of pixels constituting a photoelectric conversion unit.

FIG. 6 is a diagram describing an arrangement of pixels constituting the photoelectric conversion unit. The solid state imaging device 3 can implement HDR by a configuration in which all of the respective photoelectric conversion units 15 of the line sensors 11 and 12 include pixels 16-1 and 16-2 with different charge storage times.

The pixel 16-1 is defined as, for example, a first pixel that is set to have a charge storage time A. The pixel 16-2 is defined as, for example, a second pixel that is set to have a charge storage time A/2 that is equal to half of the charge storage time A of the pixel 16-1. A line 31 includes pixels 16-1 that are arranged in parallel in the X direction. A line 32 includes pixels 16-2 that are arranged in parallel in the X direction.

The lines 31 and 32 are arranged alternately in the Y direction. The solid state imaging device 3 drives the line sensors 11 and 12 by alternating the charge storage times between A and A/2 according to the arrangement of the lines 31 and 32. In addition, instead of having different charge storage times for the respective lines in the X direction, the photoelectric conversion unit 15 may have different charge storage times for the respective columns in the Y direction.

Figure 7:
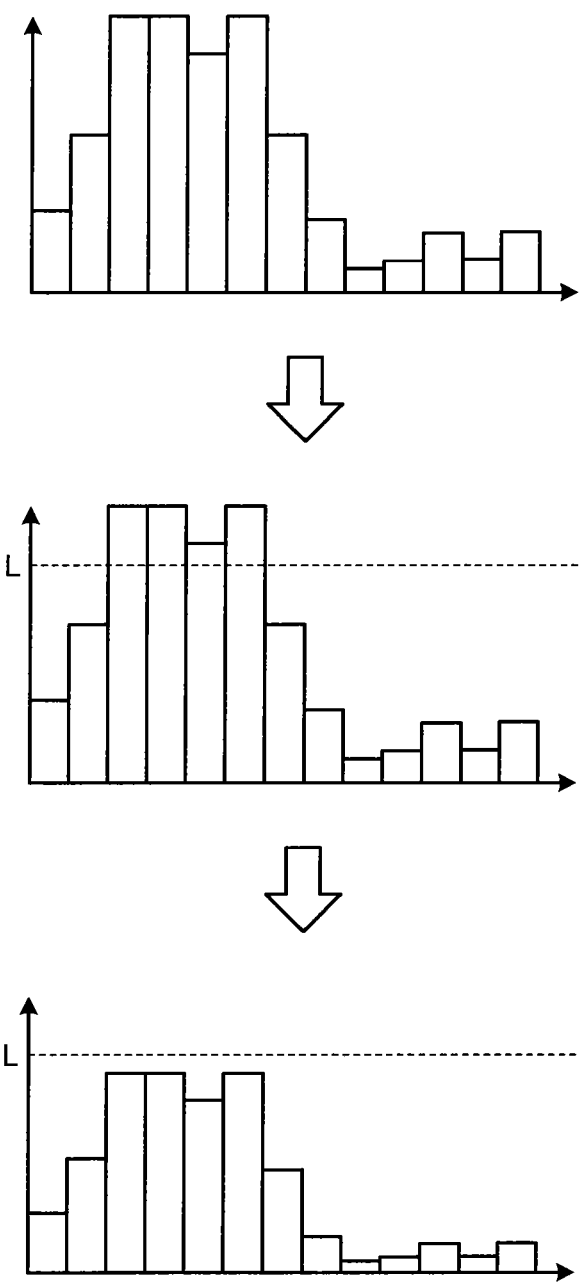
FIG. 7 is a diagram describing a relation between a luminance distribution of an object image and an output by a pixel with a different charge storage time.

FIG. 7 is a diagram describing a relation between a luminance distribution of an object image and an output by a pixel with a different charge storage time. A vertical axis of each graph illustrated in FIG. 7 represents a luminance, and a horizontal axis of the graph represents a position in an object image. For example, an object image has a luminance distribution illustrated in an upper portion of FIG. 7.

A middle portion of FIG. 7 illustrates a case where an object image having a luminance distribution illustrated in the upper portion is detected using a pixel with a long charge storage time. In this case, a low-luminance portion of the object image can be detected with high sensitivity. On the other hand, with respect to a high-luminance portion, the saturation of a signal output with respect to an incident light amount may occur in, for example, a predetermined luminance L or more. When such an output saturation occurs, it is difficult for the distance measuring device 1 to measure a distance accurately.

A lower portion of FIG. 7 illustrates a case where an object image having a luminance distribution illustrated in the upper portion is detected using a pixel with a short charge storage time. In this case, with respect to a high-luminance portion of the object image, the output saturation hardly occurs. On the other hand, with respect to a low-luminance portion, since an output level is further lowered, a signal-to-noise ratio (SNR) is worsened. Regarding the distance measuring device 1, a detection accuracy of a phase difference is lowered by the worsened SNR.

Figure 8:
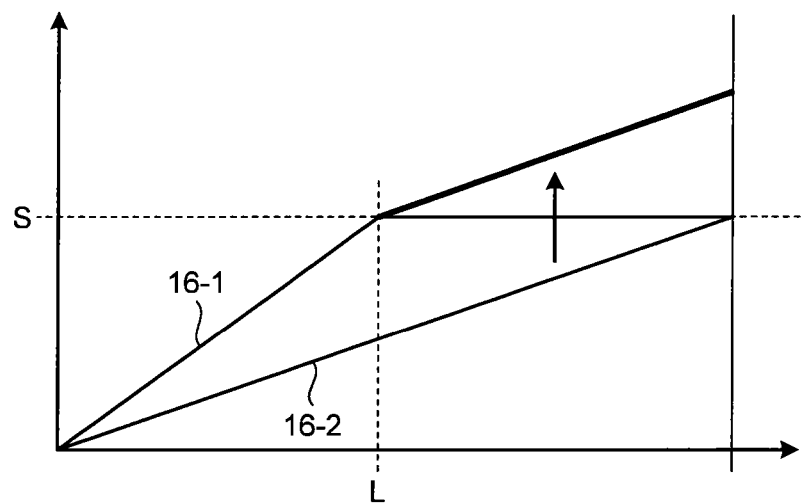
FIG. 8 is a diagram describing output characteristics of a line sensor in the first embodiment.

FIG. 8 is a diagram describing output characteristics of the line sensor in a first embodiment. A vertical axis of a graph illustrated in FIG. 8 represents an output, and a horizontal axis of the graph represents a luminance. With respect to a low-luminance portion, since the ratio of an output to an incident light amount in the pixel 16-1 with a charge storage time A (long time) is higher than that in the pixel 16-2 with a charge storage time A/2 (short time), luminance information with a good contrast can be obtained. Regarding the pixel 16-1, since an output is saturated in a predetermined luminance L or more, only a constant output S can be obtained even when the luminance increases. Unlike the pixel 16-1, the pixel 16-2 does not generate the output saturation under a normal illuminance environment and can obtain an output corresponding to an incident light amount.

The imaging processing circuit 14 obtains an output of the photoelectric conversion unit 15 by using an output of the pixel 16-1 with respect to a portion in which a luminance is lower than or equal to L, and using an output of the pixel 16-2 with respect to a portion in which a luminance is higher than L. The solid state imaging device 3 can perform HDR imaging by combining, in the HDR combining unit 19, an output of the pixel 16-1 with respect to a low-luminance portion and an output of the pixel 16-2 with respect to a high-luminance portion.

The HDR combining unit 19 multiplies (in this example, doubling) the output of the pixel 16-2 by a gain in accordance with the output of the pixel 16-1, and combines the outputs of the pixels 16-1 and 16-2. The solid state imaging device 3 can obtain a double dynamic range by setting different charge storage times A and A/2 with respect to the pixels 16-1 and 16-2 having the same sensitivity.

In addition, when a resolution in typical AD conversion is 10 bits, an output of the imaging processing circuit 14 becomes 11 bits through HDR combination. The imaging processing circuit 14 may convert the signal into the number of bits before HDR combination by performing compression processing on an HDR-combined signal. As a result, the CPU 4 can apply the same operation processing as in the conventional case of not performing HDR combination. Without performing such compression processing, the imaging processing circuit 14 may input a signal with the increased number of bits into the CPU 4.

Figure 9:
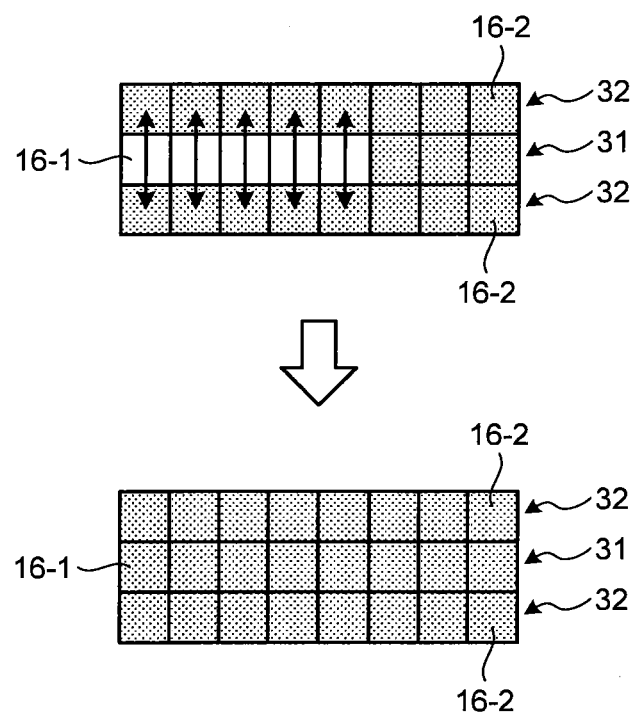
FIG. 9 is a diagram describing a specific method of HDR combination.

FIG. 9 is a diagram describing a specific method of HDR combination. The HDR combining unit 19 combines the output of the pixel 16-1 and the double of the output of the pixel 16-2. Also, for example, it is assumed that the output saturation has already occurred at five pixels 16-1 in a line 31, which are represented in white color in FIG. 9.

With respect to the pixel 16-1 that is a saturated pixel in which the output saturation with respect to an incident light amount occurs, the HDR combining unit 19 interpolates an output by using the detection result by the pixel 16-2. In this case, with respect to each pixel 16-1 that is a saturated pixel, the HDR combining unit 19 averages the outputs of two pixels 16-2 located over and under the pixel 16-1, and also perform a doubling operation. In this way, the HDR combining unit 19 interpolates an output with respect to each pixel 16-1 in which the saturation occurs. In addition, an operation for interpolation of an output with respect to the pixel 16-1 is not limited to a case according to this example, but may be performed by any technique.

The distance measuring device 1 can perform accurate distance measurement by suppressing the output saturation with respect to an incident light amount by HDR combination in the solid state imaging device 3. Also, the distance measuring device 1 can obtain luminance information with high sensitivity even in the case of a low luminance and can detect a phase difference with high accuracy.

Figure 10:
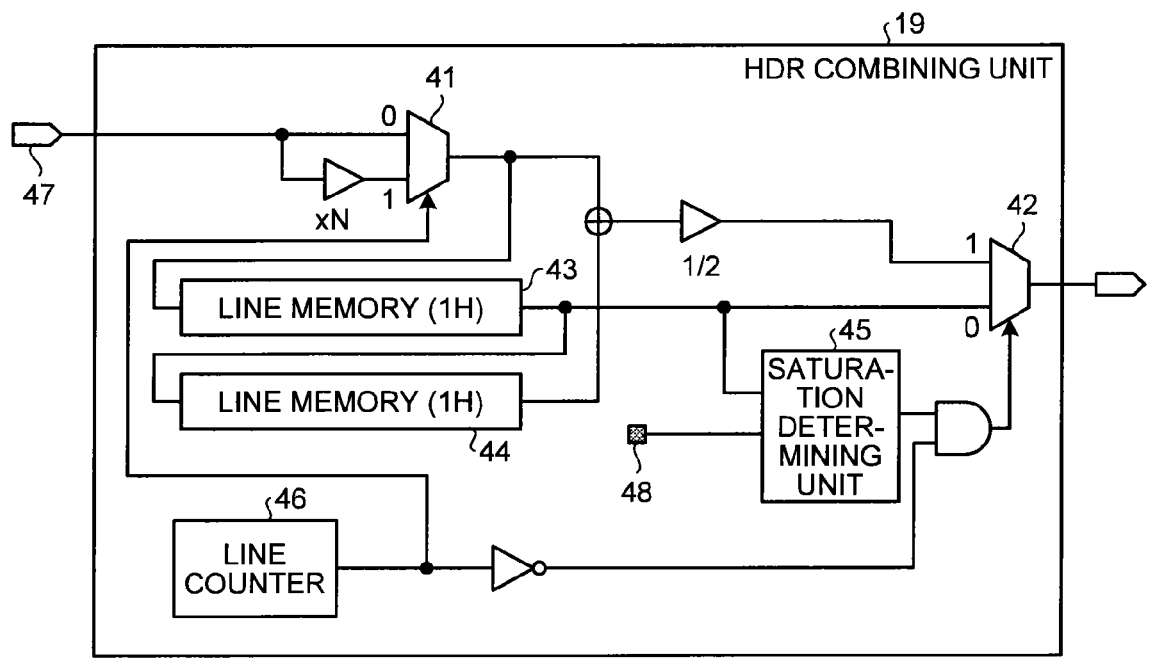
FIG. 10 is a block diagram illustrating an example of a circuit configuration included in an HDR combining unit.

FIG. 10 is a block diagram illustrating an example of a circuit configuration included in the HDR combining unit. The HDR combining unit 19 includes selectors 41 and 42, line memories (1H) 43 and 44, a saturation determining unit 45, and a line counter 46.

The line counter 46 outputs a signal indicating from which of the lines 31 and 32 a signal 47 input into the HDR combining unit 19 is output. When the signal 47 is an output from the line 31, the line counter 46 outputs, for example, "0". When the signal 47 is an output from the line 32, the line counter 46 outputs, for example, "1". The output from the line counter 46 is considered as a selection control input signal in the selector 41.

A signal 47 that is multiplied by a gain N and a signal 47 that is not multiplied by the gain N are input into the selector 41. When a selection control input signal "0" is input, the selector 41 selects the signal 47 that is not multiplied by the gain N. When a selection control input signal "1" is input, the selector 41 selects the signal 47 that is multiplied by the gain N. As a result, the HDR combining unit 19 adjusts the level of an output from the pixel 16-1 with a charge storage time A and the level of an output from the pixel 16-2 with a charge storage time A/2. In this example, it is assumed that N=2.

The line memories 43 and 44 delay a signal from the selector 41 by one line. With respect to a signal read from the line memory 43, the saturation determining unit 45 performs saturation determination to determine whether the output saturation with respect to an incident light amount occurs in the pixel 16. The saturation determining unit 45 determines the occurrence/non-occurrence of a saturation by comparing a signal read from the line memory 43 with a predetermined saturation determination threshold value 48.

When determining the occurrence of a saturation, the saturation determining unit 45 outputs a signal indicating such information, for example, "1" as a determination result. When determining the non-occurrence of a saturation, the saturation determining unit 45 outputs a signal indicating such information, for example, "0" as a determination result.

The determination result by the saturation determining unit 45 is input into the selector 42 as a logical product with an inverted signal of a signal from the line counter 46. The inverted signal of the signal from the line counter 46 indicates from which of the lines 31 and 32 the signal read from the line memory 43 is output.

As a result, when the signal read from the line memory 43 is an output from the line 31 and the saturation occurs in the pixel 16-1, "1" is input into the selector 42. When the signal read from the line memory 43 is an output from the line 31 and no saturation occurs in the pixel 16-1, "0" is input into the selector 42. In addition, when the signal read from the line memory 43 is an output from the line 32, "0" is input into the selector 42. These signals are considered as a selection control input signal in the selector 42.

The HDR combining unit 19 adds the undelayed signal from the selector 41 and the signal read from the line memory 44, and also multiplies the addition result by ½, thereby obtaining an average value of both the signals. This average value and the signal read from the line memory 43 are input into the selector 42.

When a selection control input signal "1" is input, the selector 42 selects an average value of the signal from the selector 41 and the signal read from the line memory 44. As a result, with respect to a pixel 16-1 that is a saturated pixel, the HDR combining unit 19 interpolates the output by performing substitution into an average value of the outputs from two pixels 16-2 located over and under the pixel 16-1.

When a selection control input signal "0" is input, the selector 42 selects the signal read from the line memory 43. As a result, the HDR combining unit 19 outputs the signals from the pixels 16-1 and 16-2 in which no saturation occurs, without performing interpolation.

The HDR combining unit 19 outputs the signal selected by the selector 42. In this way, the HDR combining unit 19 combines the outputs by the pixels 16-1 and 16-2. In addition, the HDR combining unit 19 is not limited to a case where substitution into an average value of the outputs from two adjacent pixels 16-2 is performed with respect to a pixel 16-1 that is a saturated pixel. The HDR combining unit 19 may interpolate the output by any technique with respect to a pixel 16-1 that is a saturated pixel.

For example, the HDR combining unit 19 may perform substitution into an output from one of two adjacent pixels 16-2 with respect to a pixel 16-1 in which the saturation occurred. In this case, the HDR combining unit 19 enables interpolation by a simple operation, thereby achieving a small-sized circuit configuration.

The imaging processing circuit 14 may perform compression processing on the signal output from the HDR combining unit 19. For example, the above-described HDR combining unit 19 increases a digital range by one bit. The imaging processing circuit 14 performs compression processing, for example, by using a gamma conversion circuit.

Figure 11:
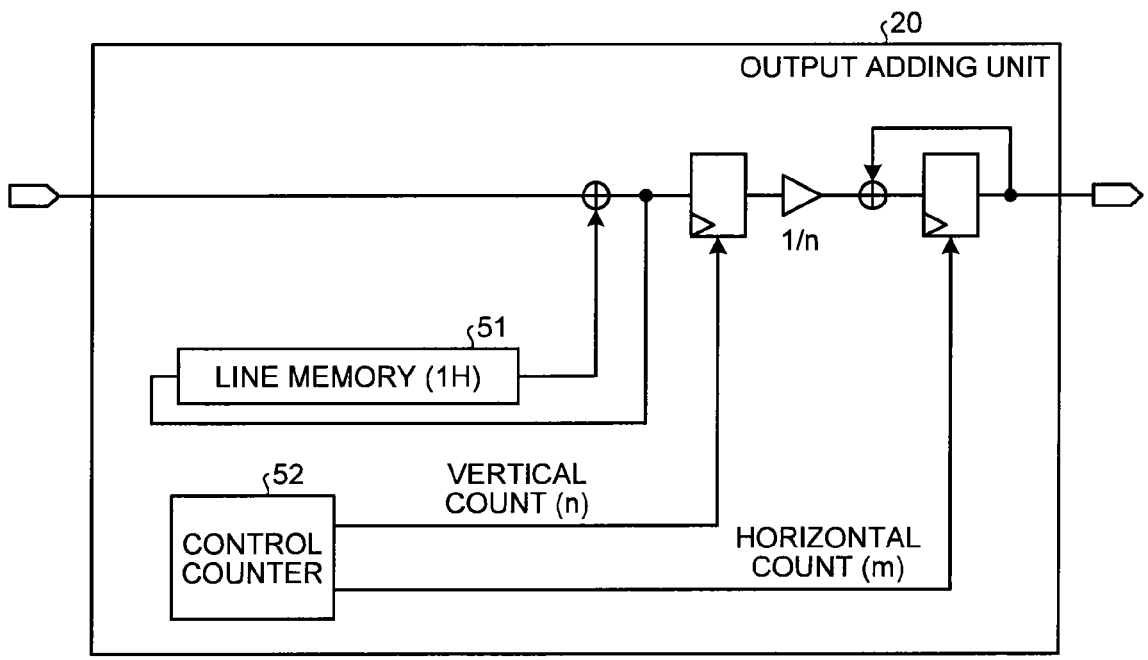
FIG. 11 is a block diagram illustrating an example of a circuit configuration included in an output adding unit.

FIG. 11 is a block diagram illustrating an example of a circuit configuration included in the output adding unit. The output adding unit 20 adds a signal that is input from the HDR combining unit 19 and is delayed in a line memory 51, and an undelayed signal. The output adding unit 20 adds the outputs of the pixels 16-1 and 16-2 with respect to a vertical direction according to a vertical count from a control counter 52. The output adding unit 20 also adds outputs with respect to a horizontal direction according to a horizontal count from the control counter 52. The output adding unit 20 outputs the addition result as an output of each photoelectric conversion unit 15.

In this manner, the distance measuring device 1 can accurately measure a distance to the object 25 by HDR combination in the solid state imaging device 3. Also, the distance measuring device 1 can perform high-speed phase difference detection as compared to a case where the solid state imaging device 3 requires charge storage a plurality of times. The distance measuring device 1 can measure a distance to an object accurately and rapidly by applying the solid state imaging device 3.

Figure 12:
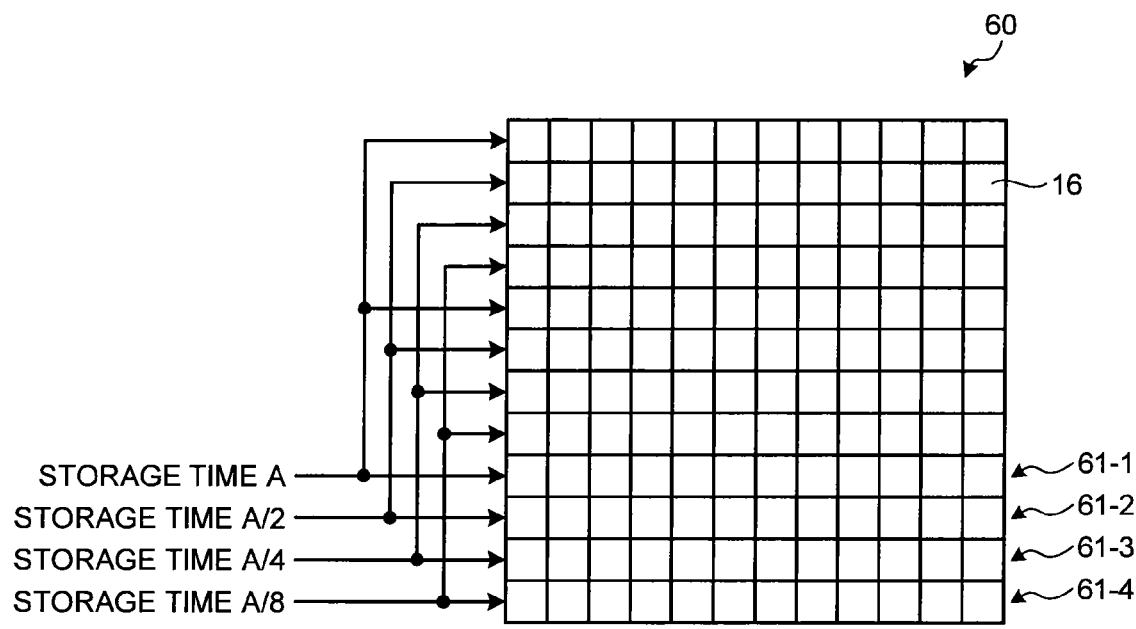
FIG. 12 is a diagram illustrating a schematic configuration of a photoelectric conversion unit provided at a line sensor in a solid state imaging device according to a second embodiment.

FIG. 12 is a diagram illustrating a schematic configuration of a photoelectric conversion unit provided at a line sensor in a solid state imaging device according to a second embodiment. As in the first embodiment, a solid state imaging device according to the present embodiment is applied to the distance measuring device 1 (see FIG. 2). The same symbols will be used to denote the same units as in the first embodiment, and redundant descriptions will not be made appropriately.

In the solid state imaging device according to the second embodiment, a photoelectric conversion unit 60 includes four lines 61-1, 61-2, 61-3, and 61-4 that have different charge storage times and are periodically arranged in parallel. In the photoelectric conversion unit 60, pixels 16 are arranged in an array configuration, for example, 12 pixels in an X direction (m=12) and 12 pixels in a Y direction (n=12).

With respect to the respective lines constituted by pixels 16 arranged in parallel to the X direction, the solid state imaging device performs control such that the charge storage times periodically change, for example, between A, A/2, A/4, and A/8. The line 61-1 is defined as a line that is set to have a charge storage time A. The line 61-2 is defined as a line that is set to have a charge storage time A/2. The line 61-3 is defined as a line that is set to have a charge storage time A/4. The line 61-4 is defined as a line that is set to have a charge storage time A/8.

Figure 13:
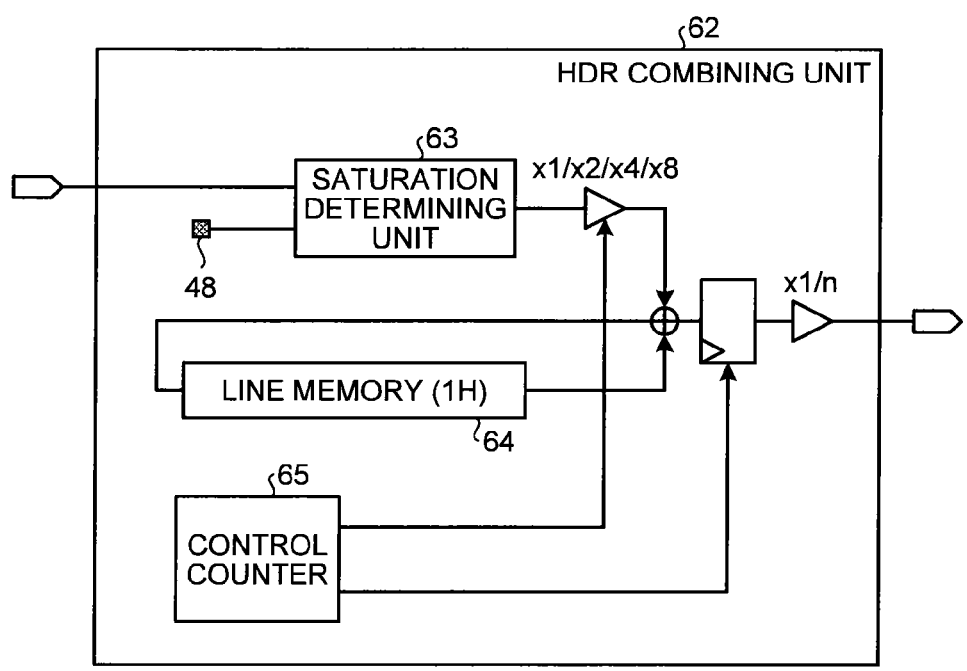
FIG. 13 is a block diagram illustrating an example of a circuit configuration included in an HDR combining unit.

FIG. 13 is a block diagram illustrating an example of a circuit configuration included in an HDR combining unit. An HDR combining unit 62 multiplies (in this example, doubling, quadrupling, and octupling) the outputs of the pixels 16 of the lines 61-2, 61-3, and 61-4 by a gain in accordance with the outputs of the pixels 16 of the line 61-1, and combines the outputs of the respective lines 61-1 to 61-4. The solid state imaging device according to the second embodiment can obtain up to an octupled dynamic range by setting different charge storage times A, A/2, A/4, and A/8 to the respective lines 61-1 to 61-4 with respect to the pixels 16 having the same sensitivity.

With respect to a signal input into the HDR combining unit 62, a saturation determining unit 63 performs saturation determination to determine whether the output saturation with respect to an incident light amount occurs in the pixel 16. The saturation determining unit 63 determines the occurrence/non-occurrence of a saturation by comparing a signal input into the HDR combining unit 62 with a predetermined saturation determination threshold value 48. When determining the non-occurrence of a saturation, the saturation determining unit 63 outputs a signal as a saturation determination target.

With respect to signals that are input from the lines 61-2, 61-3, and 61-4 and are determined to have no occurrence of a saturation, the HDR combining unit 62 multiplies (in this example, doubling, quadrupling, and octupling) the signals by a gain. According to a vertical count from a control counter 65, the HDR combining unit 62 identifies from which of the lines 61-1 to 61-4 the signal input into the HDR combining unit 62 is output, and multiplies a gain appropriately.

In addition, the HDR combining unit 62 adds a signal delayed in a line memory 64 and an undelayed signal. In the second embodiment, the HDR combining unit 62 performs the same addition processing as the output adding unit 20 in the first embodiment (see FIG. 1).

When no saturation occurs in the pixels 16 of the line 61-1 with the charge storage time A, the HDR combining unit 62 includes the respective outputs of the charge storage times A, A/2, A/4, and A/8 in an addition target. When the saturation occurs in the pixels 16 of the line 61-1 with the charge storage time A and no saturation occurs in the pixels 16 of the line 61-2 with the charge storage time A/2, the HDR combining unit 62 includes the respective outputs of the charge storage times A/2, A/4, and A/8 in an addition target.

When the saturation occurs in the pixels 16 of the lines 61-1 and 61-2 with the charge storage times A and A/2 and no saturation occurs in the pixels 16 of the line 61-3 with the charge storage time A/4, the HDR combining unit 62 includes the respective outputs of the charge storage times A/4 and A/8 in an addition target. When the saturation occurs in the pixels 16 of the lines 61-1, 61-2, and 61-3 with the charge storage times A, A/2, and A/4, the HDR combining unit 62 includes the output of the charge storage time A/8 in an addition target. The HDR combining unit 62 adds the outputs of the pixels 16 according to a vertical count from the control counter 65. The HDR combining unit 62 outputs the addition result as an output of each photoelectric conversion unit 60.

The HDR combining unit 62 applies and outputs, for example, a predetermined value with respect to the pixel 16 in which the saturation occurred. The HDR combining unit 62 can simplify a circuit configuration by applying a predetermined value to the pixel 16 in which the saturation occurred. With respect to the pixel 16 in which the saturation occurred, the HDR combining unit 62 may perform predetermined interpolation processing, for example, an operation of averaging the outputs of adjacent pixels 16.

As in the first embodiment, in the second embodiment, the distance measuring device 1 can measure a distance to an object accurately and rapidly. In the present embodiment, charge storage times corresponding to an extensive luminance range are set and unsaturated outputs are used, thereby enabling high-accuracy distance measurement by signals of a wide dynamic range.

In addition, the photoelectric conversion unit 60 is not limited to the case of a configuration in which four lines with different charge storage times are arranged in parallel. The photoelectric conversion unit 60 may have a configuration in which a plurality of lines with different charge storage times are arranged in parallel, and the configuration may be modified appropriately.

Figure 14:
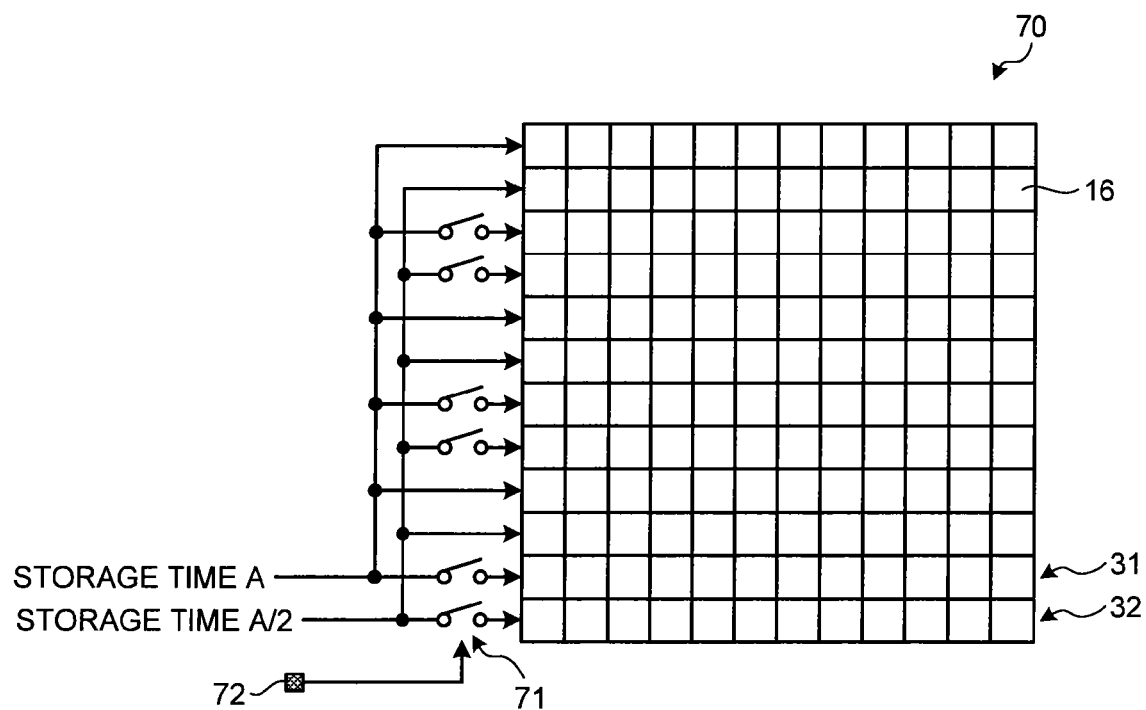
FIG. 14 is a diagram illustrating a schematic configuration of a photoelectric conversion unit provided at a line sensor in a solid state imaging device according to a third embodiment.

FIG. 14 is a diagram illustrating a schematic configuration of a photoelectric conversion unit provided at a line sensor in a solid state imaging device according to a third embodiment. As in the first embodiment, a solid state imaging device according to the present embodiment is applied to the distance measuring device 1 (see FIG. 2). The same symbols will be used to denote the same units as in the first embodiment, and redundant descriptions will not be made appropriately.

In the solid state imaging device according to the third embodiment, a photoelectric conversion unit 70 includes two lines 31 and 32 that have different charge storage times and are alternately arranged in parallel. In the photoelectric conversion unit 70, pixels 16 are arranged in an array configuration, for example, 12 pixels in an X direction (m=12) and 12 pixels in a Y direction (n=12).

A line sensor includes a switch 71 for thinned-out driving in each set of lines 31 and 32. The switch 71 switches driving of the lines 31 and 32 and stop of the driving. In the photoelectric conversion unit 70, for example, a set of lines 31 and 32 with a switch 71 and a set of lines 31 and 32 without a switch 71 are alternately arranged in the Y direction. The switch 71 switches ON and OFF according to a switching drive signal 72.

The solid state imaging device switches the switch drive signal 72, for example, according to a condition in measurement. For example, in a situation requiring detailed distance measurement, the solid state imaging device turns on each switch 71. As a result, the distance measuring device 1 can perform high-accuracy distance measurement.

For example, in normal measurement except a case where detailed measurement is required, the solid state imaging device turns off each switch 71 to perform thinned-out driving of the line sensor. Since an operation amount in an imaging processing circuit is reduced by the thinned-out driving, the distance measuring device 1 can perform high-speed distance measurement. As in the first embodiment, in the third embodiment, the distance measuring device 1 can measure a distance to an object accurately and rapidly.

In the solid state imaging device, the switch 71 may be provided for at least one of the lines constituting the photoelectric conversion unit 70. The distance measuring device 1 can switch driving and stop of the driving with respect to at least one of the lines constituting the photoelectric conversion unit 70, thereby achieving the effect of speeding up the measurement.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A distance measuring device comprising:
a first line sensor configured to detect a first object image, the first line sensor including photoelectric conversion units being arranged in a horizontal direction;
a second line sensor configured to detect a second object image, the second line sensor including photoelectric conversion units being arranged in a horizontal direction;
an imaging processing circuit configured to process signals from the first line sensor and the second line sensor; and
a CPU being input a signal that is processed by the imaging processing circuit, the CPU configured to calculate a distance to an object to be measured based on a phase difference between the first object image and the second object image,
wherein each of the photoelectric conversion units of the first line sensor and the second line sensor includes a grid of pixels, a charge storage time of each pixel in a common horizontal row of the grid of pixels is equal, and the charge storage time of pixels in any two consecutive horizontal rows of the grid of pixels is different, and
the imaging processing circuit includes:
an output combining unit configured to combine a signal of a pixel in a first row and a signal of a pixel in a second row; and
an output adding unit configured to add signals from the output combining unit with respect to pixels arranged in a photoelectric conversion unit and to output a signal of each of the photoelectric conversion units.

2. The distance measuring device according to claim 1, wherein the first row and the second row are arranged alternately in the vertical direction.

3. The distance measuring device according to claim 2, wherein the output combining unit interpolates a signal for a saturated pixel by using a signal of a second pixel that is adjacent to the saturated pixel, the saturated pixel being a first pixel in which an output saturation with respect to an incident light amount occurs, the first pixel being a pixel located in the first row, the second pixel being a pixel located in the second row.

4. The distance measuring device according to claim 3, wherein the output combining unit calculates an average value of signals of two second pixels as the signal for the saturated pixel, the two second pixels being adjacent to the saturated pixel.

5. The distance measuring device according to claim 3, wherein the output combining unit outputs a signal of one of two second pixels as the signal for the saturated pixel, the two second pixels being adjacent to the saturated pixel.

6. The distance measuring device according to claim 1, wherein each of the photoelectric conversion units of the first line sensor and the second line sensor includes a plurality of rows, each of the rows having pixels arranged in a horizontal direction, charge storage times of the rows being different from each other, and
the rows include the first row and the second row.

7. The distance measuring device according to claim 3, wherein the output combining unit outputs a signal of a predetermined value as the signal for the saturated pixel.

8. The distance measuring device according to claim 1, wherein each of the first line sensor and the second line sensor includes a switch provided at at least one of the rows, each of the rows having pixels arranged in a horizontal direction, and
the switch is configured to switch between driving the pixels and stopping the driving.

9. The distance measuring device according to claim 1, wherein the CPU is configured to:
compare signals of an output group from the first line sensor and signals of an output group from the second line sensor with respect to each of the photoelectric conversion units;
obtain differences of outputs of the respective photoelectric conversion units; and
calculate an evaluation value for detecting the phase difference, the evaluation value being a sum of the differences that is obtained.

10. A distance measuring method comprising:
detecting first object image by a first line sensor including photoelectric conversion units arranged in a horizontal direction;
detecting a second object image by a second line sensor including photoelectric conversion units arranged in a horizontal direction, each of the photoelectric conversion units of the first line sensor and the second line sensor including a grid of pixels, a charge storage time of each pixel in a common horizontal row of the grid of pixels is equal, and the charge storage time of pixels in any two consecutive horizontal rows of the grid of pixels is different;

combining a signal of a pixel in a first row and a signal of a pixel in a second row;

adding signals with respect to pixels arranged in a photoelectric conversion unit;

obtaining a phase difference between the first object image and the second object image based on a signal of each of the photoelectric conversion units; and calculating a distance to an object to be measured based on the phase difference.

11. The distance measuring method according to claim 10, wherein a signal for a saturated pixel is interpolated by using a signal of a second pixel that is adjacent to the saturated pixel, the saturated pixel being a first pixel in which an output saturation with respect to an incident light amount occurs, the first pixel being a pixel located in the first row, the second pixel being a pixel located in the second row.

12. The distance measuring method according to claim 10, wherein each of the photoelectric conversion units of the first line sensor and the second line sensor includes a plurality of rows, each of the rows having pixels arranged in a horizontal direction, charge storage times of the rows being different from each other, the rows including the first row and the second row, and a signal for a saturated pixel is interpolated by using a signal of a pixel that is adjacent to the saturated pixel, the saturated pixel being a pixel in which an output saturation with respect to an incident light amount occurs.

13. The distance measuring method according to claim 10, further comprising:

switching between driving pixels and stopping the driving with respect to at least one of rows in each of the first line sensor and the second line sensor, each of the rows having pixels arranged in a horizontal direction.

14. The distance measuring method according to claim 10, further comprising:

comparing signals of an output group from the first line sensor and signals of an output group from the second line sensor with respect to each of the photoelectric conversion units;

obtaining differences of outputs of the respective photoelectric conversion units; and calculating an evaluation value for detecting the phase difference, the evaluation value being a sum of the differences that is obtained.

* * * * *